United States Patent
Ngo

(10) Patent No.: US 7,231,278 B2
(45) Date of Patent: Jun. 12, 2007

(54) CONTINUED EXECUTION OF ACCESSOR COMMANDS ON A RESTRICTED MULTIPLE ACCESSOR PATH OF AN AUTOMATED DATA STORAGE LIBRARY

(75) Inventor: Khanh Vi Ngo, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 154 days.

(21) Appl. No.: 11/174,318

(22) Filed: Jul. 5, 2005

(65) Prior Publication Data

US 2005/0246058 A1 Nov. 3, 2005

Related U.S. Application Data

(62) Division of application No. 10/720,886, filed on Nov. 21, 2003, now Pat. No. 6,968,257.

(51) Int. Cl.
G06F 7/00 (2006.01)
(52) U.S. Cl. .................................. 700/213; 700/255
(58) Field of Classification Search ................ 700/213, 700/214, 218, 244, 255
See application file for complete search history.

(56) References Cited

U.S. PATENT DOCUMENTS

| | | | |
|---|---|---|---|
| 5,894,461 A | 4/1999 | Fosler et al. .................. 369/34 |
| 6,038,490 A * | 3/2000 | Dimitri et al. ............... 700/214 |
| 6,144,519 A | 11/2000 | Hanaoka et al. .............. 360/92 |
| 6,304,524 B1 | 10/2001 | Gallo et al. .................... 369/34 |
| 6,309,162 B1 | 10/2001 | White .......................... 414/273 |
| 6,351,685 B1 * | 2/2002 | Dimitri et al. ............... 700/214 |
| 6,421,579 B1 * | 7/2002 | Dimitri et al. ............... 700/214 |
| 6,532,402 B2 | 3/2003 | Ostwald et al. ............. 700/250 |
| 6,591,164 B1 | 7/2003 | Plutt et al. ................... 700/245 |
| 6,785,588 B2 | 8/2004 | Dimitri et al. ............... 700/214 |

FOREIGN PATENT DOCUMENTS

JP 4023118 A 1/1992

* cited by examiner

Primary Examiner—Khoi H. Tran
(74) Attorney, Agent, or Firm—John H. Holcombe

(57) ABSTRACT

In an automated data storage library having a plurality of accessors which access portable data storage media with respect to storage shelves and data storage drive(s) along a path, a controller, in response to detection of restricted movement of an accessor at a position along the path, determines a range of motion of another accessor along the path which avoids interfering with the accessor having the restricted movement. The controller also determines a limit to commands of a work queue of commands for operating the accessors, the limit extending from and past the position of the accessor having the restricted movement, along the path; and prevents execution of the limited commands. The limited commands may be failed with a "hardware" error.

28 Claims, 4 Drawing Sheets

CONTINUED EXECUTION OF ACCESSOR COMMANDS ON A RESTRICTED MULTIPLE ACCESSOR PATH OF AN AUTOMATED DATA STORAGE LIBRARY

REFERENCE TO RELATED APPLICATION

This application is a division of application Ser. No. 10/720,886, filed Nov. 21, 2003 now U.S. Pat. No. 6,968,257.

FIELD OF THE INVENTION

This invention relates to automated data storage libraries, and, more particularly, to libraries having a plurality of accessors which separately access and transport portable data storage media with respect to a plurality of storage shelves and at least one data storage drive.

BACKGROUND OF THE INVENTION

Automated data storage libraries provide a means for storing large quantities of data in portable data storage media, such as magnetic tape cartridges, optical disk cartridges, etc., that are stored in a readily available form at storage shelves of the library. The portable data storage media are accessed and transported with respect to the storage shelves and at least one data storage drive by an accessor, and the data storage drive(s) transfer data with respect to the portable data storage media.

Typically, data stored at portable data storage media of an automated data storage library, once requested, is needed quickly. Thus, it is desirable that an automated data storage library continue to be in operational condition as much as possible, such as the well known "24×7×365" availability. If only a single accessor is supported, an error to operation of the accessor can cause customer downtime. Hence, the addition of another accessor will aid in reducing customer downtime and impact. The accessors typically operate on the same path to serve the entire library on the one path, and can work in a "hot standby" configuration, or in a "dual active" or "multiple active" configuration. In a hot standby configuration, only one accessor is active at any single time, and another accessor is in standby mode, waiting for an operational failure to occur on the active accessor. Thus, the standby accessor would only take over in the event of a failure of the active accessor, and the standby accessor may push the active accessor into a service bay, and would become the active accessor. Examples of active/standby accessors comprise U.S. Pat. No. 5,894,461 and U.S. Pat. No. 6,309,162. In a multiple active configuration, both of the accessors are active, and move within separate virtual libraries, or sections of the automated data storage library, which may overlap. In the event of a failure of one of the accessors, another accessor would push the failed accessor into a service bay, and would take over for the entire automated data storage library. An example of multiple active accessors comprises U.S. Pat. No. 6,304,524.

A key element in reducing customer downtime and impact is to clear the aisle or accessor path in the event of an accessor failure so that the library is fully functional and to allow the other accessor full access to the whole library. Therefore, if the failing accessor is unable to move out of the path, another accessor must try to push the failing accessor into a service bay, so that the another accessor will have full access to the whole library, which eliminates customer downtime. However, there are certain scenarios where failures can halt the library. An example of an error that causes customer downtime is if there is a stuck portable data storage media cartridge between the accessor and a drive or storage shelf. Another example is if a cartridge has been dropped and is blocking the accessor along the path. The path is typically a rail, and the cartridge may jam between the accessor and the rail. In each example, the accessor is failed due to the stuck or jammed cartridge, and it may not be possible to move the failed accessor, halting the operation of the library.

SUMMARY OF THE INVENTION

Disclosed are an automated data storage library, a controller, a method and a computer program product for providing continued execution of accessor commands on a restricted multiple accessor path of the automated data storage library. The library comprises a plurality of storage shelves for storing portable data storage media; at least one data storage drive for transferring data with respect to the portable data storage media; and a plurality of accessors which separately access and transport portable data storage media with respect to the plurality of storage shelves and the data storage drive(s), along at least one path, and which interfere with one another along the path.

In one embodiment, the library controller operates the plurality of accessors, and, in response to detection of restricted movement of one of the accessors at a position along the path, determines a range of motion of another of the accessors along the path which avoids interfering with the accessor having the restricted movement, at the position along the path.

In a further embodiment, the automated data storage library additionally comprises a plurality of frames in sequence along the at least one path, the frames supporting the storage shelves and the data storage drive(s). The library controller additionally determines the frame in which the accessor having the restricted movement is positioned, to detect the position along the at least one path of the accessor having the restricted movement.

Still further, the library controller determines the range of motion comprising limiting motion of the another accessor to the frames of the sequence, extending from a frame of the sequence spaced from the frame in which the accessor having the restricted movement is positioned, to one end of the automated data storage library, all in the direction of the path toward the another accessor.

In another embodiment, the storage shelves of the automated data storage library are arranged in a plurality of columns along the path; and the library controller additionally determines the column at which the accessor having the restricted movement is substantially positioned, to detect the position along the at least one path of the accessor having the restricted movement.

Still further, the library controller determines the range of motion comprising limiting motion of the another accessor along the at least one path, extending from a column spaced from the column at which the accessor having the restricted movement is positioned, to one end of the automated data storage library, all in the direction of the path toward the another accessor.

In a further embodiment, the library controller additionally operates the another of the plurality of accessors to attempt to move the failed accessor, detecting restricted movement by failure to move the failed accessor, and detecting the position of the another accessor along the at least one path at the failure.

Still further, the failed accessor having the restricted movement, provides a movement failure indication, and the library controller detects the restricted movement of one of the plurality of accessors, from a received movement failure indication from the failed accessor.

In another embodiment, the automated data storage library comprises a work queue of commands for operating at least one of the plurality of accessors. The library controller detects restricted movement of one of the plurality of accessors at a position along the at least one path; determines a limit to commands of the work queue, the limit from and past the position of the accessor having the restricted movement, along the at least one path; and prevents execution of the limited commands. Further, the library controller fails the limited commands with a "hardware" error with respect to host commands to prevent execution of the limited commands.

In a still further embodiment, wherein the commands for operating accessors comprise at least an origin and a destination, the library controller determines whether either an origin or a destination of a command of the work queue is beyond the limit, to determine the limit to commands of the work queue.

In an embodiment wherein the automated data storage library comprises a plurality of frames in sequence along the path, the library controller determines the frame in which the accessor having the restricted movement is positioned, and the library controller establishes the limit to commands of the work queue at a frame of the sequence spaced from the frame in which the accessor having the restricted movement is positioned, the frame spaced in the direction of the at least one path toward the another accessor, to determine the limit to commands of the work queue.

In an embodiment wherein the storage shelves are arranged in a plurality of columns along the path, and the library controller determines the column at which the accessor having the restricted movement is substantially positioned, the library controller establishes the limit to commands of the work queue at a column spaced from the column at which the accessor having the restricted movement is positioned, the column of the limit spaced in the direction of the path toward the another accessor, to determine the limit to commands of the work queue.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
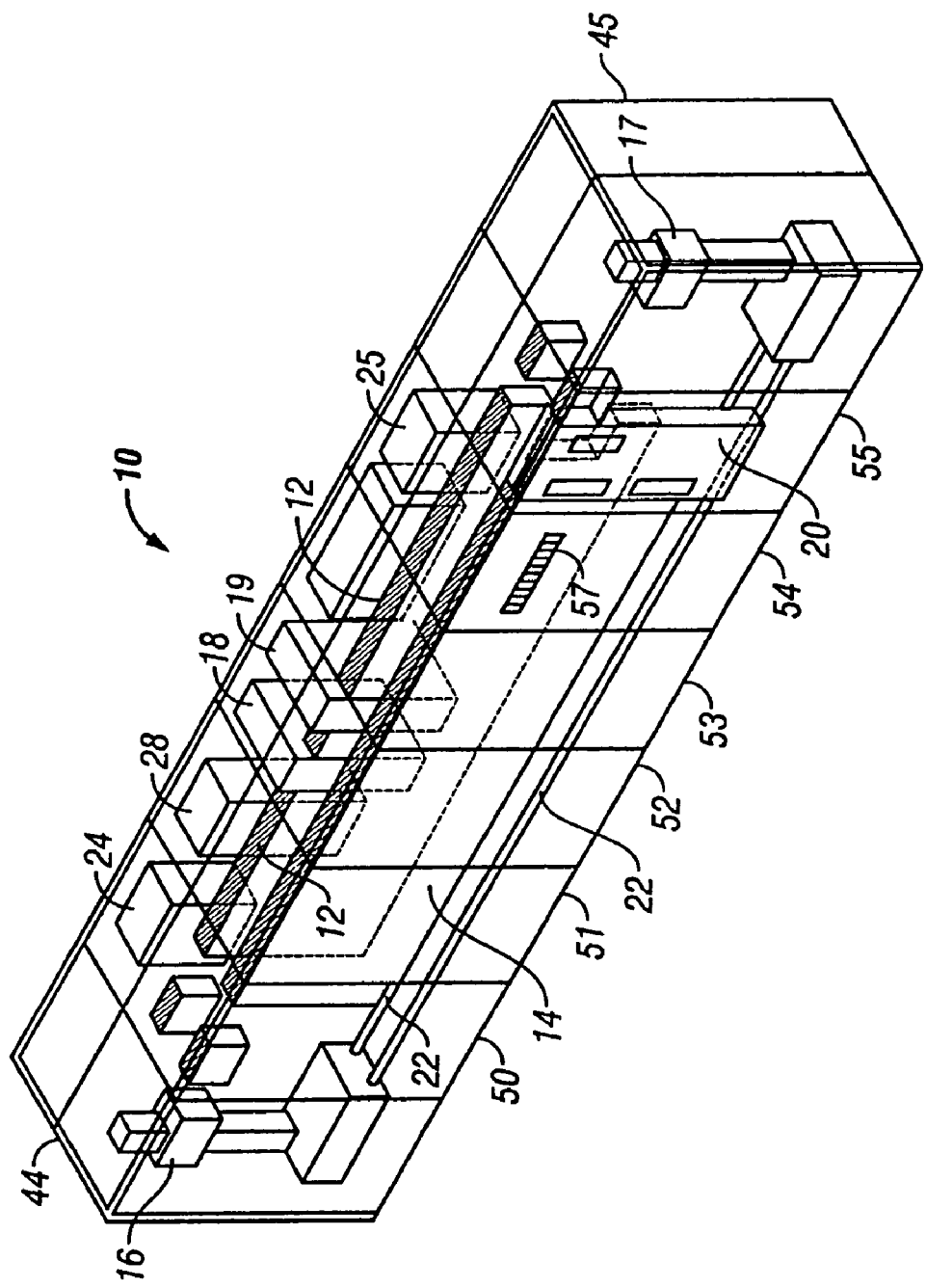
FIG. 1 is a diagrammatic representation of an automated data storage library in accordance with the present invention.

Referring to FIG. 1, an automated data storage library is illustrated having an inner "wall" of storage shelves 12 and an outer wall of storage shelves 14, which store portable data storage media. The data storage media typically comprise a self-contained cartridge. Examples include magnetic tape cartridges or optical disk cartridges of various types, such as ROM, WORM, and rewriteable, and in various formats. For universal reference to any of these types of media, the terms "portable data storage media" are used herein.

The automated data storage library of the present invention is a multiple accessor library, the embodiment of the present invention illustrated in FIG. 1 having at least two accessors 16 and 17. The accessors separately access and transport portable data storage media with respect to the plurality of storage shelves 12 and 14 and data storage drives 18 and 19 for reading and/or writing data on the accessed portable data storage media. In the exemplary automated data storage library, a media import/export port is provided for insertion or retrieval of portable data storage media into or out of the library. The accessors 16 and 17 run on rails 22 defining a path in the aisle between the inner wall of storage shelves 12 and the outer wall of storage shelves 14.

An operator interface 28 is provided for allowing a servicing operator or systems operator to communicate with the automated data storage library.

A library controller 24 and a supplemental or back up controller 25 are provided to operate the accessors 16 and 17. The library controller 24 may comprise a programmable computer processor having computer readable code embodied therein for controlling the operation of the library, and specifically the accessors 16 and 17. In an alternative embodiment, an embedded and/or distributed control system may be provided in which the functions of the library controllers 24 and/or 25 are distributed amongst a plurality of processors located, for example, at distributed points of the library. The library controller typically receives commands from a host system for access to particular portable data storage media or to media in particular storage shelves, and to deliver the data storage media to a data storage drive, and subsequently to return the portable data storage media to a storage shelf. The starting or access location of a command is called an origin, and the delivery location of a command is called a destination. The library controller typically has a work queue for queuing commands for accessing and transporting portable data storage media. Commands for reading and or writing specific data or data at locations on the selected data storage media are typically communicated directly to the data storage drives 18, 19.

An example of an automated data storage library 10 is the IBM 3494 Data Storage Library. Another example, with a distributed control system, is the IBM 3584 Ultra Scalable Tape Library.

Figure 2:
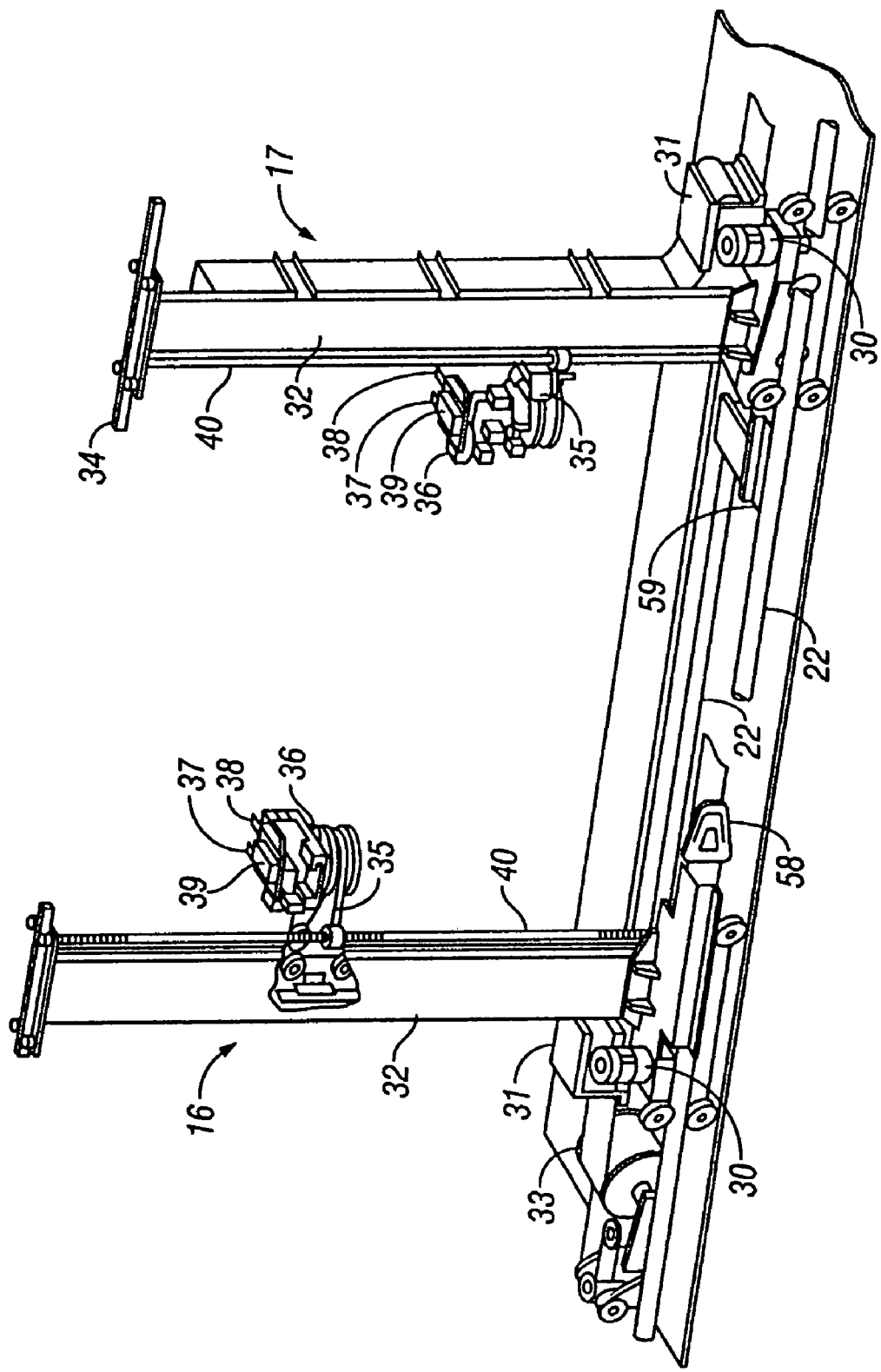
FIG. 2 is a perspective view illustration of the accessors of the automated data storage library of FIG. 1.

The accessors 16 and 17 are illustrated in greater detail in FIG. 2. The accessors run horizontally on the rails along the library path by "X" drives 33 (only one drive is shown) and associated bands connected to running sections 31 of the accessors. A pillar 32 is vertically attached to each of the running sections 31 of the accessors and rides in a top rail 34 to provide vertical stability. Robotic manipulators 36 are mounted on lifting sections 35, and "Y" motors 30 rotate drive elements 40 to move the robotic manipulators 36 along the pillars 32.

In the embodiment illustrated in FIG. 2, each of the robotic manipulators 36 comprises as components, a set of grippers 37 and 38 and a scanner or reader 39. The manipulator 36 can rotate 180° to switch the grippers to the opposite sides and can access media at either storage shelves 12 or 14 in FIG. 1. Thus, either gripper can grip a portable data storage media at an outside storage shelf 14 of FIG. 1 and be rotated to deliver the portable data storage media to a data storage drive 18, 19 at the inside of the library. Alternatively, a separate set of grippers may be provided at opposite sides of the manipulator 36, and data storage drives provided at opposite sides of the accessor path.

The scanners or readers 39 can read information, such as bar code data, or other labeling information, from the portable data storage media or from locations on the library to identify the media or to identify the location of the accessor in the library.

Figure 3:
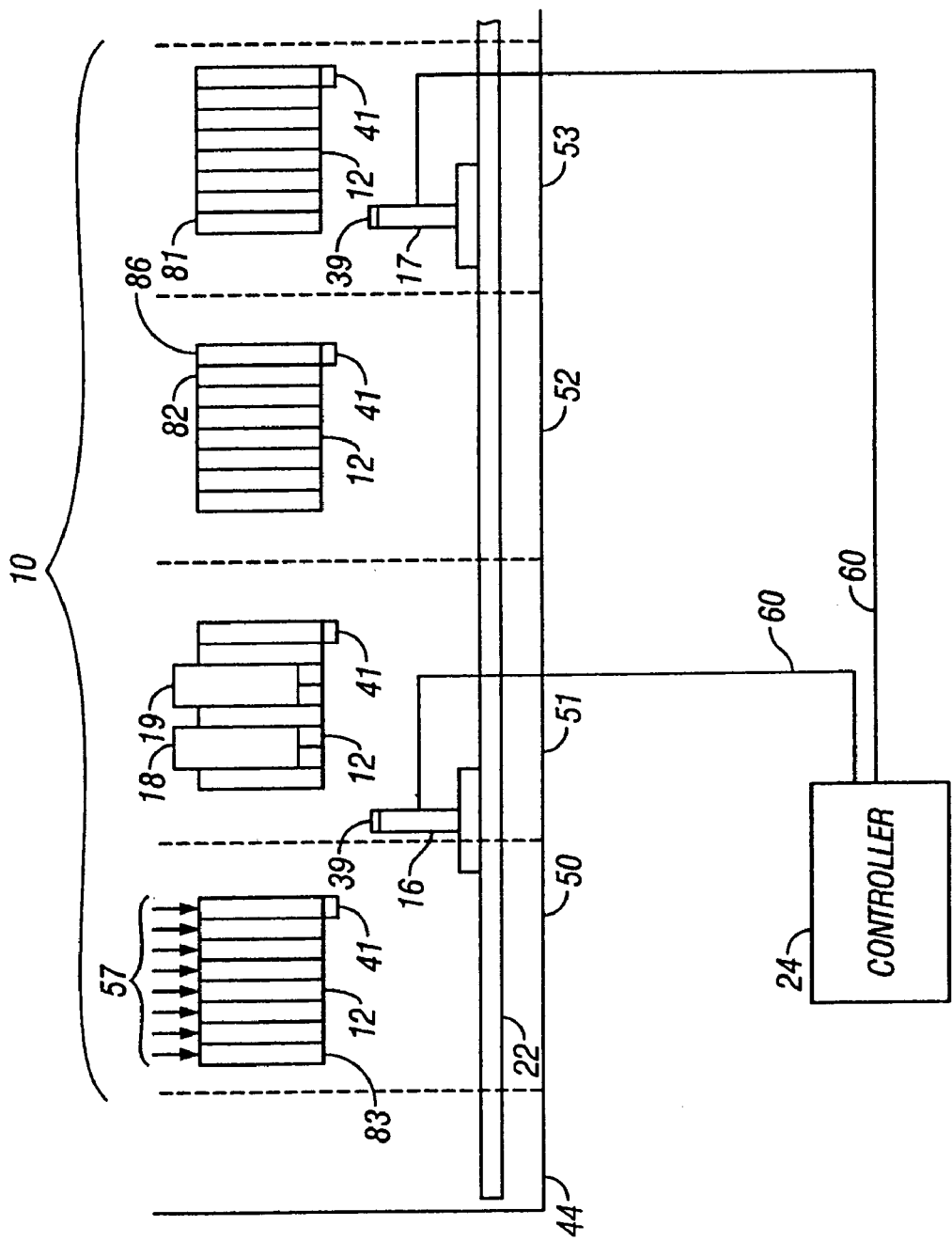
FIG. 3 is schematic representation of a portion of the automated data storage library of FIGS. 1 and 2.

Referring additionally to FIG. 3, a controller 24 is illustrated as coupled to the accessors 16 and 17 by means of communication links 60. Controller 25 may also be coupled to the accessors. The communication links 60 may comprise direct cabling, a bus system, or a wireless connection. Alternatively, distributed processors may be mounted at the accessors and/or data storage drives and/or elsewhere in the library.

Referring to FIGS. 1 and 3, the illustrated embodiment of the library is arranged in a plurality of frames 50, 51, 52, 53, 54 and 55, and the storage shelves 12 and 14 are arranged in parallel columns 57. The storage shelves are disposed in the columns along a "Y" axis perpendicular to the rails 22. One or more of the frames 50–55 also contain the data storage drives 18, 19, which are positioned such that the accessor grippers 37 and 38 can insert or remove the portable data storage media at the drives.

Location information 41, such as bar code data, or other labeling information, may be provided in the library to be read by a scanner or reader 39 to identify the location of the accessor in the library, for example, for initialization of the accessor servos. Thus, the accessors 16 and 17 will be able to locate desired storage shelves and data storage drives. Further, the accessors 16 and 17 will be able to identify their location within the library, for example, by continuous tracking of the accessor servos. Typically, the continuous tracking is both in the "X" direction and the "Y" direction.

Service bays 44 and 45 are provided at each end of the library. The accessors 16 and 17 typically operate on the same path to serve the entire library along the one path, and interfere with one another along the path. Alternatively, parallel paths may be provided, but the accessors still interfere with one another along the paths. Pass-thru alcoves may be provided, possibly with storage shelves, into which an accessor may be switched, allowing another accessor to pass by along the main path. The accessors 16 and 17 can work in a "hot standby" configuration, or in a "dual active" or "multiple active" configuration. In a hot standby configuration, only one accessor is active at any single time, and another accessor is in standby mode, waiting for an operational failure to occur with the active accessor. The standby accessor will be placed in a service bay 44 or 45. Thus, the standby accessor would only take over in the event of a failure of the active accessor. Referring additionally to FIG. 2, the standby accessor may employ a bumper 58, 59 to push the failed active accessor into a service bay, and would become the active accessor. In a multiple active configuration, both of the accessors 16 and 17 are active, and move within separate virtual libraries, or sections of the automated data storage library, which may overlap. In the event of a failure of one of the accessors, another accessor may employ a bumper 58, 59 to push the failed accessor into a service bay and take over for the whole automated data storage library.

Figure 4:
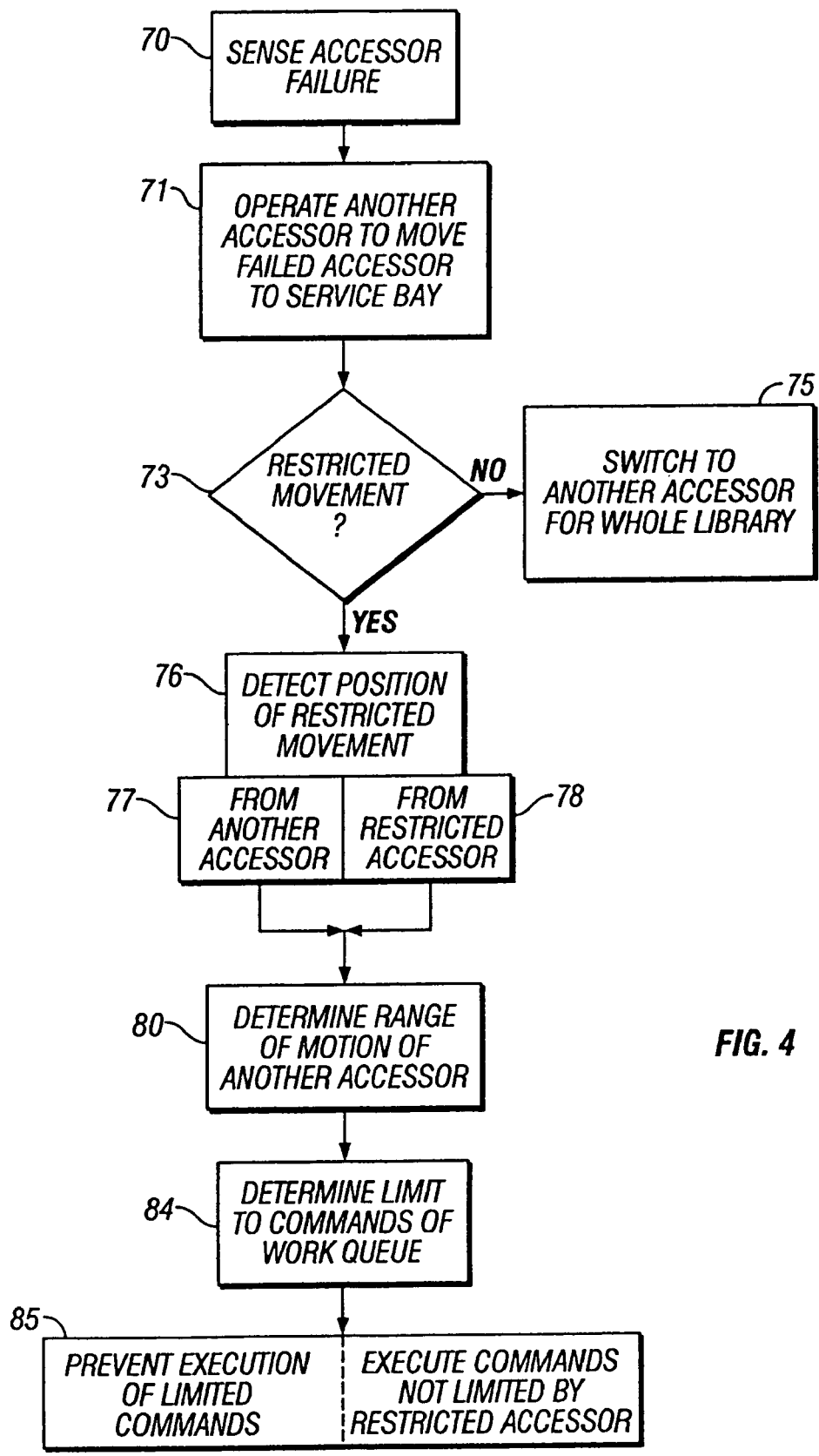
FIG. 4 is a flow chart depicting the method of the present invention.

The present invention is directed to continued execution of accessor commands on a restricted multiple accessor path. Referring additionally to FIG. 4, failure of an accessor 16 or 17 of FIGS. 1–3 is sensed in step 70. The failure may be of any type which is not immediately recoverable and which prevents immediate continuance of use of the accessor. The failure may be sensed by the controller as a failure to successfully complete a command after a required number of retries or other error handling procedures, or may be signaled by the failing accessor. In step 71, another accessor is operated by the controller 24 or 25 to employ bumper 58, 59 to push the failed accessor into a service bay 44 or 45, as discussed above. Alternatively or additionally, the failed accessor may first attempt to move into the service bay on its own.

Step 73 of FIG. 4 detects restricted movement of the failed accessor. In one embodiment, where the library controller additionally operates another of the plurality of accessors to attempt to move the failed accessor, the detection of the restricted movement is detected by failure to move the failed accessor. The controller may identify the restricted movement by the expiration of a timer without success in moving the failed accessor; by a failure for the servo of the another accessor to increment despite the application of power; or by other signal from the another accessor. In another embodiment, the failed accessor having the restricted movement, provides a movement failure indication, and the library controller detects the restricted movement from a received movement failure indication from the failed accessor.

If, instead, the failed accessor can move or can be moved into a service bay, step 73 leads to step 75, and another accessor, if standby, becomes the active accessor, and if one of multiple active accessors, takes over for the whole automated data storage library, as discussed above.

If step 73 detects that the failed accessor is stuck, such that its movement is restricted at a position along the path, the controller, in step 76, detects the position of the accessor along the path. As discussed above, in one example, the servo systems of accessors 16 and 17 continually track their current positions. In one embodiment, indicated by step 77, the controller may identify the position of the restricted movement by the indication of the servo system, or by another signal, from the another accessor. In one embodiment, the controller extrapolates the position of the failed accessor from the servo information of the another accessor. In another embodiment, indicated by step 78, the failed accessor having the restricted movement, provides the servo indication of its servo system to indicate its position. In still another embodiment, the controller continually tracks the servo position signals from the accessor before failure, and uses the last position at the time of the failure as the position of the failed accessor.

In one embodiment, illustrated by step 80, the library controller, in response to detection of restricted movement of one of the accessors at a position along the path, determines a range of motion of another of the accessors along the path which avoids interfering with the accessor having the restricted movement, at the position along the path.

In one embodiment, wherein the automated data storage library is arranged as a plurality of frames in sequence along the path, the library controller, in step 80, determines from the servo information, the one of the frames 50–55 of FIGS. 1 and 3 in which the accessor having the restricted movement is positioned. The library controller determines the range of motion comprising limiting motion of the another accessor to the frames of the sequence, extending from a frame of the sequence spaced from the one of the frames in which the accessor having the restricted movement is positioned, to one end of the automated data storage library, all in the direction of the at least one path toward the another accessor. For example, if the accessor having the restricted movement is accessor 17, and it is positioned in frame 53, as illustrated in FIG. 3, the range of motion may be determined to be frames 50, 51 and 52.

In another embodiment, wherein the storage shelves of the automated data storage library are arranged in a plurality of columns along the path; the library controller, in step 80, determines the one of the columns 57 of the storage shelves 12 and/or 14 of FIGS. 1 and 3 at which the accessor having the restricted movement is substantially positioned. The library controller determines the range of motion comprising limiting motion of the another accessor along the path, extending from a column spaced from the column at which the accessor having the restricted movement is positioned, to one end of the automated data storage library, all in the direction of the at least one path toward the another accessor. For example, if the accessor having the restricted movement is accessor 17 and it is substantially positioned at column 81, the range of motion may be determined to be from column 82 of frame 52 to column 83 of frame 50. The range of motion may be specifically defined, for example, in terms of the "X" servo positions of the another accessor.

In another embodiment, the library controller 24 of FIGS. 1 and 3 detects restricted movement of one of the plurality of accessors at a position along the path; in step 84 of FIG. 4, determines a limit to commands of the work queue, the limit from and past the position of the accessor having the restricted movement, along the path; and, in step 85, prevents execution of the limited commands. The limit to commands of the work queue may also be based on frames or columns, as above. In step 85, commands that are not limited by the restricted accessor are executed.

In an embodiment where the library is arranged in a plurality of frames in sequence along the path, the library controller determines the one of the frames 50–55 of FIGS. 1 and 3 in which the accessor having the restricted movement is positioned, and the library controller, in step 84, establishes the limit to commands of the work queue at a frame of the sequence spaced from the one of the frames in which the accessor having the restricted movement is positioned, the frame spaced in the direction of the path toward the another accessor. For example, if the accessor having the restricted movement is accessor 17, and it is positioned in frame 53, as illustrated in FIG. 3, the limit to commands of the work queue may be determined to be frame 53, and any command to frames 53–55 of FIG. 1 for the accessor 16 are prevented in step 85. Commands that are not limited by the restricted accessor and/or are within the range of motion are executed. Thus, commands to frames 50–52 are executed in step 85.

In an embodiment wherein the storage shelves are arranged in a plurality of columns along the path, the library controller determines the one of the columns at which the accessor having the restricted movement is substantially positioned, and the library controller, in step 84, establishes the limit to commands of the work queue at a column spaced from the column at which the accessor having the restricted movement is positioned, the column of the limit spaced in the direction of the path toward the another accessor. For example, if the accessor having the restricted movement is accessor 17, and it is positioned substantially at column 81, as illustrated in FIG. 3, the limit to commands of the work queue may be determined to be from column 86, and any command for access to column 86 or toward service bay 45 of FIG. 1 by the accessor 16 are prevented in step 85. Commands that are not limited by the restricted accessor are executed. Thus, commands to column 82 or toward service bay 44 are executed.

In an example, where the commands for operating the accessors comprise at least an origin and a destination, the library controller determines whether either an origin or a destination of a command of the work queue is beyond the limit of the commands of the work queue.

In one example, the library controller fails the limited commands with a "hardware" error to prevent execution of the limited commands. Commands typically originate with a host system (via a SCSI, Fibre Channel, etc., communication system), an operator panel or service panel, or over the web. A "hardware" error typically is a specific response within the protocol of the communication system. For example, in SCSI protocol (also for Fibre Channel) a "hardware" error is signaled with a "04" sense key and a "4400" additional sense codes (ASC) and additional sense code qualifiers (ASCQ).

The method of the present invention may be carried out by a computer program product usable with the programmable computer processor having computer readable code embodied therein, comprising controller 24 and/or controller 25 of FIGS. 1 and 3. The computer program product may be stored on a storage medium, such as a CD-ROM, or magnetic tape, etc., or may be supplied from a host system to the controller (s).

The illustrated components of the automated data storage library of FIGS. 1–3 may be varied, combined, or combined functions may be separated, as is known to those of skill in the art. The illustrated steps of FIG. 4 may be altered in sequence, omitted, or other steps added, as is known to those of skill in the art.

While the preferred embodiments of the present invention have been illustrated in detail, it should be apparent that modifications and adaptations to those embodiments may occur to one skilled in the are without departing from the scope of the present invention as set forth in the following claims.

What is claimed is:

1. An automated data storage library, comprising:
   a plurality of storage shelves for storing portable data storage media;
   at least one data storage drive for transferring data with respect to said portable data storage media;
   a plurality of accessors which separately access and transport portable data storage media with respect to said plurality of storage shelves and said at least one data storage drive, along at least one path, and which interfere with one another along said at least one path;
   a work queue of commands for operating at least one of said plurality of accessors; and
   a library controller for operating said plurality of accessors, said library controller:
   detects restricted movement of one of said plurality of accessors at a position along said at least one path;
   determines a limit extending to commands of said work queue, said limit from and past said position of said accessor having said restricted movement, along said at least one path; and
   prevents execution of said limited commands.

2. The automated data storage library of claim 1, wherein said library controller fails said limited commands with a "hardware" error to prevent execution of said limited commands.

3. The automated data storage library of claim 1, wherein said commands for operating said at least one of said plurality of accessors comprise at least an origin and a destination, and wherein said library controller determines whether either an origin or a destination of a command of said work queue is beyond said limit, to determine said limit to commands of said work queue.

4. The automated data storage library of claim 3, wherein said automated data storage library comprises a plurality of frames in sequence along said at least one path; and wherein said library controller additionally determines the one of said frames in which said accessor having said restricted movement is positioned, to detect said position along said at least one path of said accessor having said restricted movement.

5. The automated data storage library of claim 4, wherein said library controller establishes said limit to commands of said work queue at a frame of said sequence spaced from said one of said frames in which said accessor having said restricted movement is positioned, said frame spaced in the direction of said at least one path toward said another accessor, to determine said limit to commands of said work queue.

6. The automated data storage library of claim 3, wherein said storage shelves are arranged in a plurality of columns along said at least one path; and wherein said library controller additionally determines the one of said columns at which said accessor having said restricted movement is substantially positioned, to detect said position along said at least one path of said accessor having said restricted movement.

7. The automated data storage library of claim 6, wherein said library controller establishes said limit to commands of said work queue at a column spaced from said column at which said accessor having said restricted movement is positioned, said column of said limit spaced in the direction of said at least one path toward said another accessor, to determine said limit to commands of said work queue.

8. A controller for operating a plurality of accessors of an automated data storage library which separately access said automated data storage library along at least one path, and which interfere with one another along said at least one path, said automated data storage library having a work queue of commands for operating at least one of said plurality of accessors, said controller:
    detects restricted movement of one of said plurality of accessors at a position along said at least one path;
    determines a limit extending to commands of said work queue, said limit from and past said position of said accessor having said restricted movement, along said at least one path; and
    prevents execution of said limited commands.

9. The controller of claim 8, wherein said controller fails said limited commands with a "hardware" error to prevent execution of said limited commands.

10. The controller of claim 8, wherein said commands for operating said at least one of said plurality of accessors comprise at least an origin and a destination, and said controller determines whether either an origin or a destination of a command of said work queue is beyond said limit, to determine said limit to commands of said work queue.

11. The controller of claim 10, wherein said automated data storage library comprises a plurality of frames in sequence along said at least one path; and wherein said controller additionally determines the one of said frames in which said accessor having said restricted movement is positioned, to detect said position along said at least one path of said accessor having said restricted movement.

12. The controller of claim 11, wherein said controller establishes said limit to commands of said work queue at a frame of said sequence spaced from said one of said frames in which said accessor having said restricted movement is positioned, said frame spaced in the direction of said at least one path toward said another accessor, to determine said limit to commands of said work queue.

13. The controller of claim 10, wherein said automated data storage library comprises a plurality of storage shelves for storing portable data storage media for access by said plurality of accessors, said storage shelves arranged in a plurality of columns along said at least one path; and wherein said controller additionally determines the one of said columns at which said accessor having said restricted movement is substantially positioned, to detect said position along said at least one path of said accessor having said restricted movement.

14. The controller of claim 13, wherein said controller establishes said limit to commands of said work queue at a column spaced from said column at which said accessor having said restricted movement is positioned, said column of said limit spaced in the direction of said at least one path toward said another accessor, to determine said limit to commands of said work queue.

15. A method for operating a plurality of accessors of an automated data storage library which separately access said automated data storage library along at least one path, and which interfere with one another along said at least one path, said automated data storage library having a work queue of commands for operating at least one of said plurality of accessors, said method comprising the steps of:
    detecting restricted movement of one of said plurality of accessors at a position along said at least one path;
    determining a limit extending to commands of said work queue, said limit from and past said position of said accessor having said restricted movement, along said at least one path; and
    preventing execution of said limited commands.

16. The method of claim 15, wherein said step of preventing execution of said limited commands additionally comprises failing said limited commands with a "hardware" error.

17. The method of claim 15, wherein said commands for operating said at least one of said plurality of accessors comprise at least an origin and a destination, and said step of determining a limit to commands of said work queue comprises determining whether either an origin or a destination of a command of said work queue is beyond said limit.

18. The method of claim 17, wherein said automated data storage library comprises a plurality of frames in sequence along said at least one path; and wherein said step of detecting said restricted movement of one of said plurality of accessors at a position along said at least one path, additionally comprises determining the one of said frames in which said accessor having said restricted movement is positioned.

19. The method of claim 18, wherein said step of determining a limit to commands of said work queue comprises establishing said limit at a frame of said sequence spaced from said one of said frames in which said accessor having said restricted movement is positioned, said frame spaced in the direction of said at least one path toward said another accessor.

20. The method of claim 17, wherein said automated data storage library comprises a plurality of storage shelves for storing portable data storage media for access by said plurality of accessors, said storage shelves arranged in a plurality of columns along said at least one path; and wherein said step of detecting said restricted movement of one of said plurality of accessors at a position along said at least one path, additionally comprises determining the one of said columns at which said accessor having said restricted movement is substantially positioned.

21. The method of claim 20, wherein said step of determining a limit to commands of said work queue comprises establishing said limit at a column spaced from said column at which said accessor having said restricted movement is positioned, said column of said limit spaced in the direction of said at least one path toward said another accessor.

22. A computer program product usable with at least one programmable computer processor having computer readable code embodied therein, said at least one programmable computer processor for operating a plurality of accessors of an automated data storage library which separately access said automated data storage library along at least one path, and which interfere with one another along said at least one path, said automated data storage library having a work queue of commands for operating at least one of said plurality of accessors, said computer program product comprising:

computer readable program code causing said at least one programmable computer processor to detect restricted movement of one of said plurality of accessors at a position along said at least one path;

computer readable program code causing said at least one programmable computer processor to determine a limit extending to commands of said work queue, said limit from and past said position of said accessor having said restricted movement, along said at least one path; and computer readable program code causing said at least one programmable computer processor to prevent execution of said limited commands.

23. The computer program product of claim 22, wherein said computer readable program code causing said at least one programmable computer processor to prevent execution of said limited commands, additionally comprises computer readable program code causing said at least one programmable computer processor to fail said limited commands with a "hardware" error.

24. The computer program product of claim 22, wherein said commands for operating said at least one of said plurality of accessors comprise at least an origin and a destination, and wherein said computer readable program code causing said at least one programmable computer processor to determine a limit to commands of said work queue, comprises computer readable program code causing said at least one programmable computer processor to determine whether either an origin or a destination of a command of said work queue is beyond said limit.

25. The computer program product of claim 24, wherein said automated data storage library comprises a plurality of frames in sequence along said at least one path; and additionally comprising computer readable program code causing said at least one programmable computer processor to determine the one of said frames in which said accessor having said restricted movement is positioned, to detect said position along said at least one path of said accessor having said restricted movement.

26. The computer program product of claim 25, wherein said computer readable program code causing said at least one programmable computer processor to determine a limit to commands of said work queue comprises establishing said limit at a frame of said sequence spaced from said one of said frames in which said accessor having said restricted movement is positioned, said frame spaced in the direction of said at least one path toward said another accessor.

27. The computer program product of claim 24, wherein said automated data storage library comprises a plurality of storage shelves for storing portable data storage media for access by said plurality of accessors, said storage shelves arranged in a plurality of columns along said at least one path; and wherein said computer readable program code causing said at least one programmable computer processor to detect said restricted movement of one of said plurality of accessors at a position along said at least one path, additionally comprises determining the one of said columns at which said accessor having said restricted movement is substantially positioned, to detect said position along said at least one path of said accessor having said restricted movement.

28. The computer program product of claim 27, wherein said computer readable program code causing said at least one programmable computer processor to determine a limit to commands of said work queue comprises establishing said limit at a column spaced from said column at which said accessor having said restricted movement is positioned, said column of said limit spaced in the direction of said at least one path toward said another accessor.

* * * * *